Figure 5:
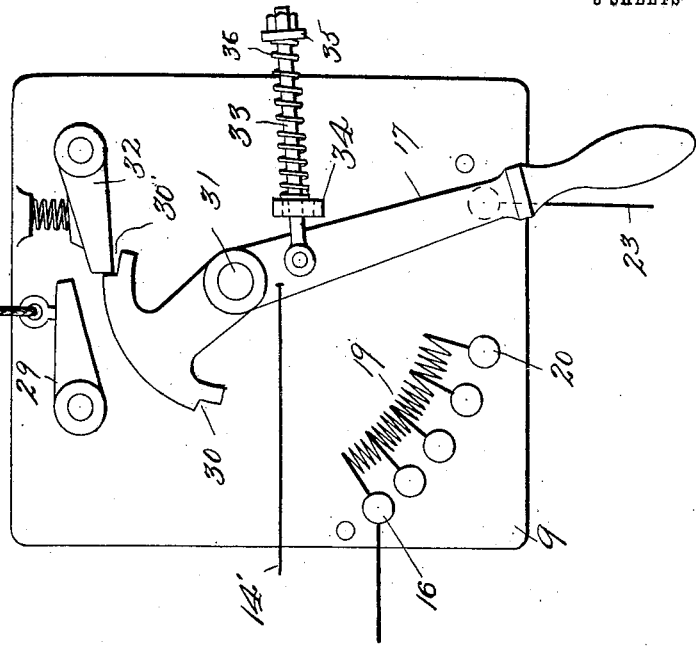

No. 826,206. PATENTED JULY 17, 1906.
H. A. WILLIAMS.
COMBINED SAFETY CLUTCH AND WIRING SYSTEM.
APPLICATION FILED OCT. 22, 1904.
3 SHEETS—SHEET 1.
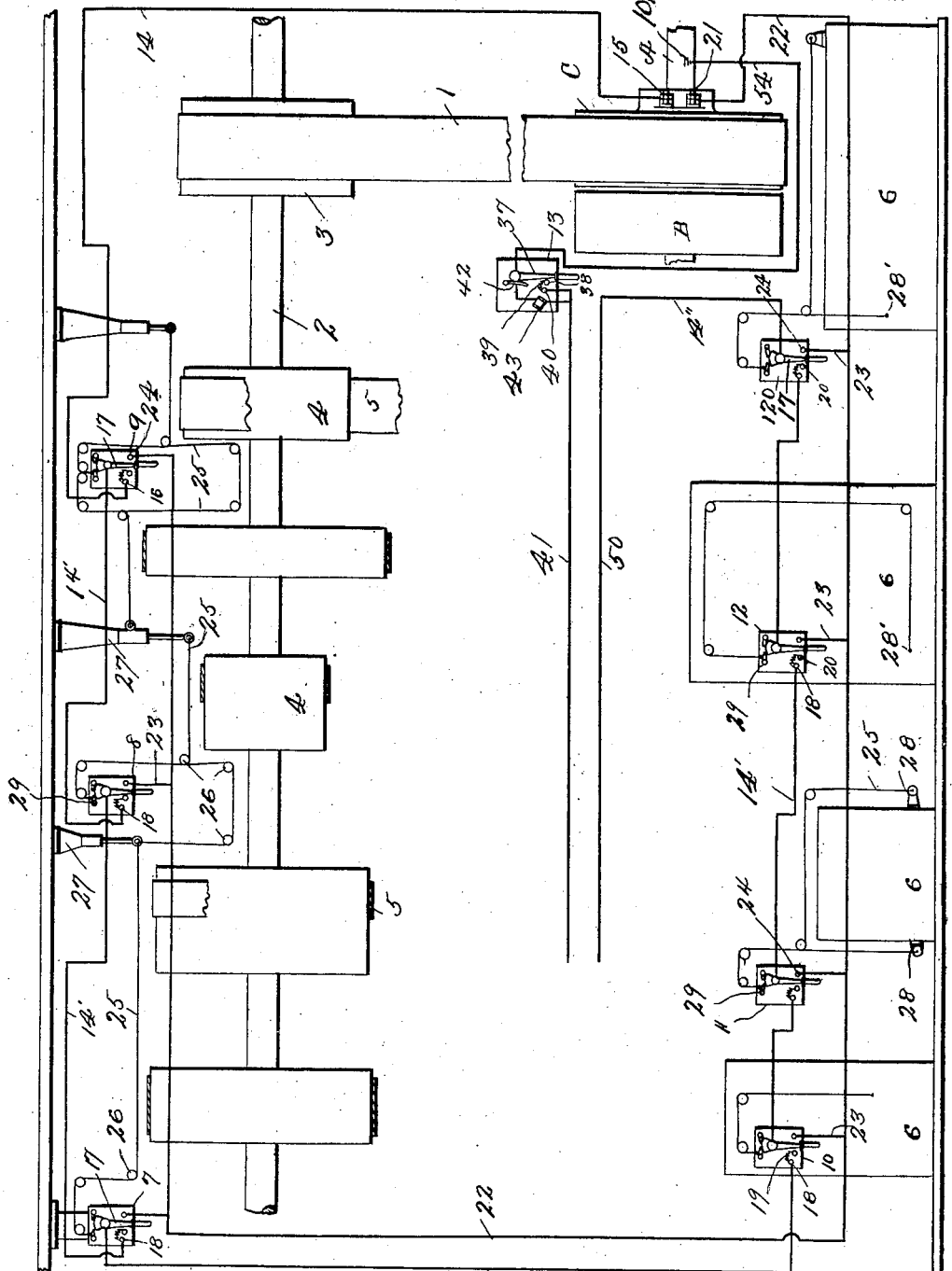
WITNESSES:
Chas. K. Davis.
M. E. Moore
FIG. 1.
Harry A. Williams INVENTOR
Attorney No. 826,206. PATENTED JULY 17, 1906.
H. A. WILLIAMS.
COMBINED SAFETY CLUTCH AND WIRING SYSTEM.
APPLICATION FILED OCT. 22, 1904.
3 SHEETS—SHEET 2.
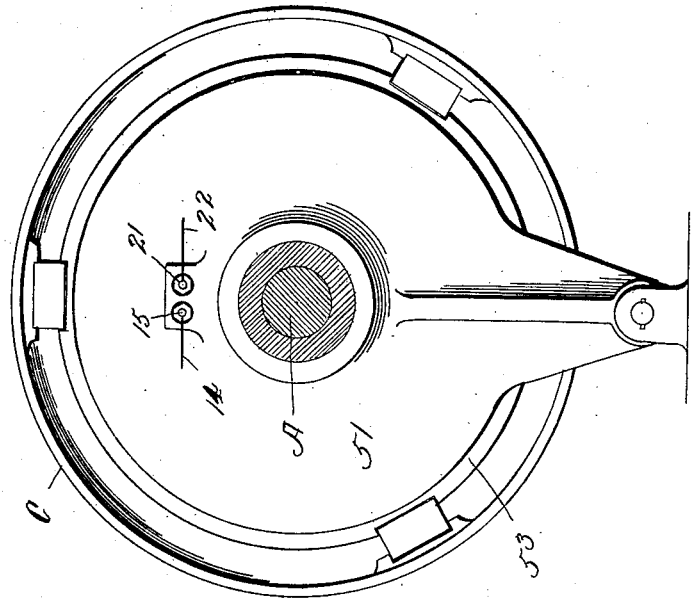
FIG. 3.
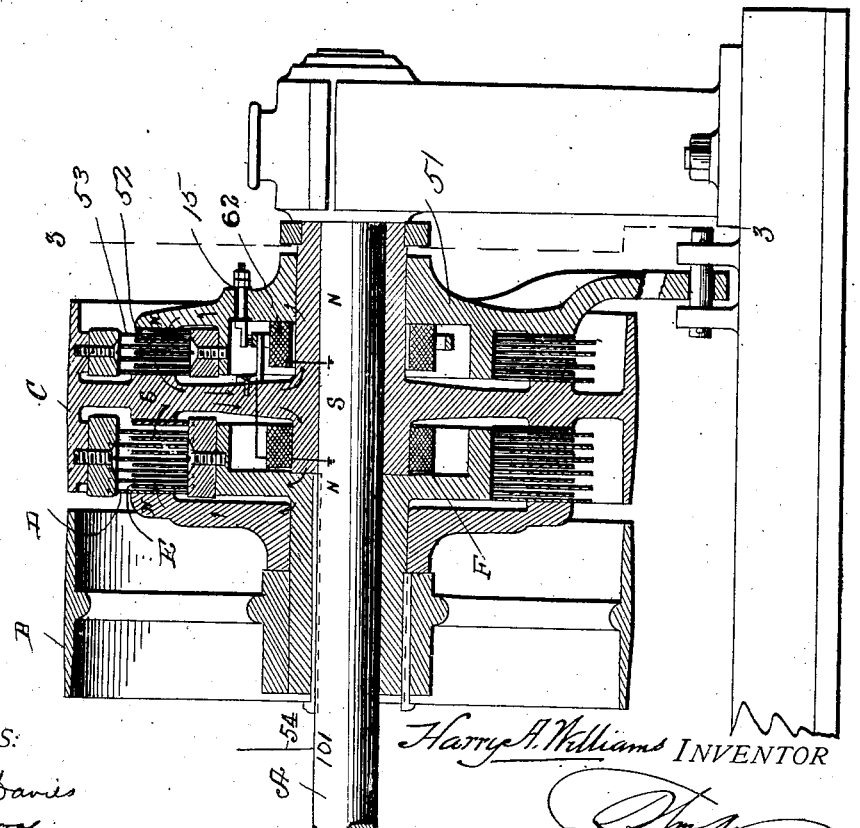
FIG. 2.
WITNESSES:
Chas. K. Davies
M. E. Moore
Harry A. Williams INVENTOR
BY 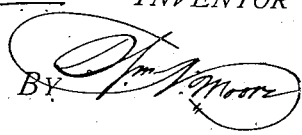
Attorney No. 826,206. PATENTED JULY 17, 1906.
H. A. WILLIAMS.
COMBINED SAFETY CLUTCH AND WIRING SYSTEM.
APPLICATION FILED OCT. 22, 1904.

3 SHEETS—SHEET 3.

WITNESSES:
Chas. K. Davies
M. E. Moore

INVENTOR
Harry A. Williams
BY M. Moore
Attorney

THE NORRIS PETERS CO., WASHINGTON, D. C.

UNITED STATES PATENT OFFICE.

HARRY A. WILLIAMS, OF AKRON, OHIO.

COMBINED SAFETY-CLUTCH AND WIRING SYSTEM.

No. 826,206.   Specification of Letters Patent.   Patented July 17, 1906.

Application filed October 22, 1904. Serial No. 229,521.

*To all whom it may concern:*

Be it known that I, HARRY A. WILLIAMS, a citizen of the United States, residing at Akron, in the county of Summit and State of Ohio, have invented certain new and useful Improvements in a Combined Safety-Clutch and Wiring System, of which the following is a specification.

My invention relates to improvements in a combined safety-clutch and wiring system, and has for its object the provision of a system of electric wiring and safety-cords placed in position about machinery pulleys, shafting, &c., in a shop or factory, whereby the breaking of a cord or pressure or tension on the cord at any point in the system will instantly and suddenly cause the electric current, which is the prime mover of the machinery, to be cut out of operation, thus withdrawing power from the machinery of the whole plant and immediately apply a brake to the driving-wheel which furnishes power to the plant to stop said wheel instantaneously.

The invention is particularly efficient in case an operator of the machinery should by accident come in contact with a moving part thereof, the safety cords or wires being so placed about the machinery that should such an accident occur the safety-wire will first be broken or pulled, thus creating a break in the electric clutch-operating circuit whereby the machinery is stopped.

The invention consists of a system of non-electric wires or cords run around and about the different pieces of machinery and connected to and adapted to operate any one of a series of switches disposed throughout the electric circuit which is run throughout the shop or factory, the switches being connected to each other and to a main safety-switch. The circuit when completed includes a clutch mechanism for driving the machinery and by a reverse current is applicable to a braking mechanism connected with the clutch. Thus when pressure is applied to a cord at any part of the shop or factory in which the system is installed the pressure will cause an operation of the nearest switch to which the particular cord is attached, whereby the driven member of the clutch is disengaged and the brake on the driven member is also made to operate to immediately stop the rotation of said member, thus instantaneously stopping not only the machinery around which the particular safety-cord is passed, but also the machinery of the entire plant in which said machine is operated.

At the head of the system or circuit I place a main safety-switch, which in case the current is cut off in the circuit and it is desired to start the machinery again enables a gradual increase of power by employing a resistance-wire and contact-points for the switch-lever to engage, thus starting the machinery without shock or jar.

It will be understood that by means of my system the machinery or any part thereof may be controlled by the electrical connections. The machinery may be started or stopped by the manipulation of a switch or switches in the circuit, which operates to engage or disengage the clutch or brake.

The invention further consists in certain novel features of construction and combinations and arrangements of parts, as will be hereinafter described and claimed.

Figure 4:
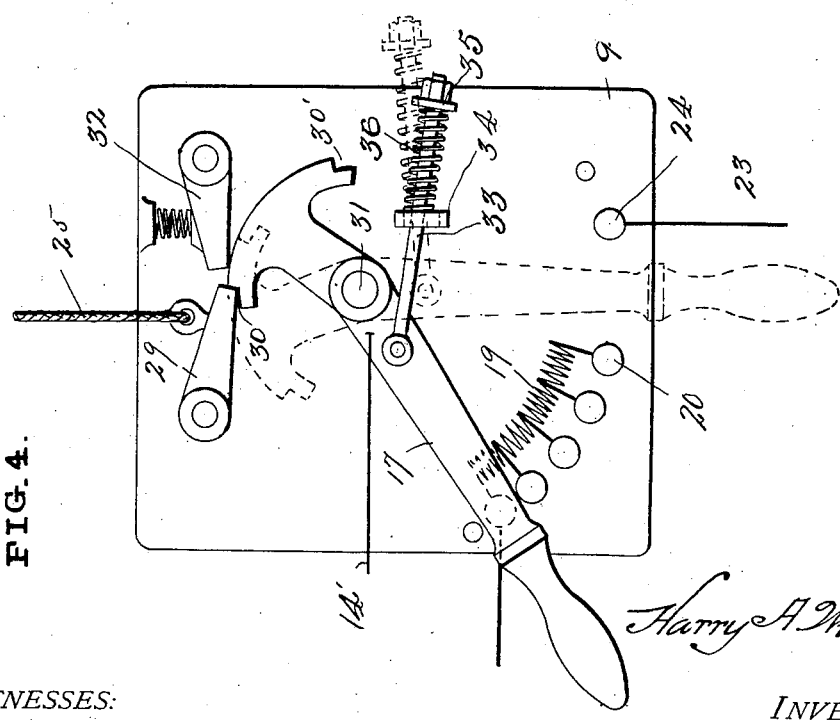

In the accompanying drawings, Figure 1 is a diagrammatic representation of the installation of my system. Fig. 2 is a vertical sectional view of the clutch mechanism employed in conjunction with the system. Fig. 3 is a view taken on line 3 3, Fig. 2. Fig. 4 is an enlarged plan view of one of the switches, showing the switch in full lines in position when the circuit is closed and the machinery running and in dotted lines when the circuit is broken and machinery idle. Fig. 5 is a plan of the switch in Fig. 4 with the circuit completed to operate the brake mechanism connected to the clutch mechanism in Fig. 2.

Referring particularly to Fig. 1 of the drawings, it will be observed that the shaft A carries the driving-wheel B and driven wheel C of a clutch mechanism. The driven wheel C forms the driving-wheel for the plant of the shop or factory and will be referred to as the "driving-wheel" hereinafter. Wheel B is rigid on shaft A, and wheel C is loose thereon; but when the clutch is in engagement both wheels rotate with shaft A. Power is transmitted from shaft A and wheel B to wheel C and by belt 1 to shaft 2 through wheel or pulley 3. Located on the line-shafting 2 and rotatable therewith are a number of pulleys or wheels 4, having belts 5 adapted to operate different pieces of machinery, as 6. Thus the entire plant is driven from the clutch mechanism. Distributed throughout the shop or factory and located at convenient intervals I employ a number of electric switches, as 7 8 9 10 11 12 120, and a main safety-switch, as 13. Said safety-switches are electrically connected by the clutch-circuit, the first wire 14 from pole 15 on the driving-wheel C of the clutch and connected at point 16 to switch 9, and the succeeding switches are connected by wires 14' from each switch-lever 17 to the switch-point 18. From lever 17 of switch 120 the wire 14'' is continued through the feed-wire 50 to the source of supply. The contact-point 16 and points 18 are each connected by a resistance 19 to points 20 of the switches.

The above-described connections form the clutch-circuit, and when the circuit is completed the clutch members are in operative engagement to drive the machinery.

The current flows through feed-wire 41, through switch 13, and wire 54, which is connected to shaft A at 101, from which point the current passes to the brake-coil 62, thence to pole 21, from which leads the wire 22, having short wires 23 connected to the points 24 of the switches shown in the circuit. In case one of the switch-levers 17 is thrown to point 24 the current then passes through said switch (switch 120, for instance) and through wire 14'' and feed-wire 50 to the source of power.

The switches in either of the two circuits may of course be operated by hand to clutch the driving mechanism or to brake it; but I employ safety wires or rods, as 25, which are run around and among the machinery, passing over wheels 26 and supported on hangers 27 and brackets 28 and also suitably attached to the machinery at 28'.

Each cord 25 is attached at one end to a pawl 29 on each switchboard, which is adapted to engage a notch 30 on the end of lever 17, as shown in Fig. 4. In the positions shown in Fig. 1 all the pawls 29 are disengaged, as the machinery is at rest. When the machinery is in operation, all the levers 17 are located on points 18 of the switches and the pawls 29 and notches 30 are in engagement. Levers 17 are pivoted at 31 and in addition to notch 30 are provided with a second notch 30', in which spring-pressed pawl 32 is adapted to engage. An arm 33 is pivoted to the lever 17 and passed through stationary loop 34. Between the nut and washer 35 on said arm and the loop 34 a spring 36 is located. Thus the lever 17 may be moved to the left against the tension of the spring 36, to the point 18, and held there by the engagement of pawl 29 with notch 30. If pawl 29 is withdrawn, the spring 36 will pull the lever to the right (see Fig. 5) to point 24 until spring-pressed pawl 32 engages notch 30', thus holding the lever 17 on point 24.

The operation of the clutch will first be described. Assuming the machinery of the plant to be at rest except shaft A and wheel B, to operate the machinery of the plant it is necessary that all switches 7 to 12 and 120 be in circuit, the levers 17 being on points 18, as in Fig. 4, and held there by engagement of the pawls 29. Then lever 37 of the main switch 13 is moved to point 38, where a slight current is thrown into the circuit, and by a further movement to the left the resistance 39 permits the current to gradually increase throughout the circuit until the point 40 is reached by lever 37. Thus the current passes from feed-wire 41, point 40, lever 37, through wire 54 and is connected to the shaft A, thence to the coil F of the clutch, causing a magnetic flux to flow through plates D and E, as indicated by the arrows. The electric current thence passes across the web of the wheel C, through the collector-ring G to pole 15, wire 14 through the switches, and back to wire 50, thus drawing said plates into frictional contact, as shown and described in my application for patent, Serial No. 229,523, filed of even date herewith, and causes wheel B to drive wheel C, the wheel C in turn driving belt 1, wheel 3, shaft 2, and pulleys 4 and machinery 6 by belts 5.

In case of accident and cord 25 is pulled, thus moving pawl 29 on any switchboard, (see Fig. 5,) spring 33 pulls lever 17 away from points 18 and 20, thus breaking the clutch-circuit and disengaging the members of the clutch mechanism. Spring 33 continues to pull lever 17 to the right until said lever rests on point 24, and said lever is there held by spring-pressed pawl 32 engaging notch 30' of lever 17, thus connecting the brake-circuit. The current now travels in reverse direction from feed-wire 50, wire 14'', through the switches to lever 17 on switch 9, then to point 24, wire 23 at switch 9, and brake-circuit 22 to pole 21, thence through pole 21, located on brake member 51, which pole is in electrical connection with coil 62, Fig. 2, thence flowing through said coil is grounded on shaft A, which is connected to ground-wire 54. Stationary contact-rings 52 and rotatable contact plates or rings 53 of wheel C are energized by magnetic flux induced by coil 62, and the magnetic flux passes in the path of arrows from N to S, (being a reverse current from the direction of the current in the clutch-circuit,) causing said plates or rings to frictionally engage and instantaneously stop the wheel C. The circuits are grounded by wire 54 to the shaft A.

Having thus fully described my invention, what I claim as new, and desire to secure by Letters Patent, is—

1. An electric circuit having a plurality of switches and driven machinery therein a brake for said machinery and a continuous cord or wire connected to each switch adapted when under tension to break said circuit to disconnect the machinery and operate the brake.

2. An electric circuit having a plurality of switches and driven machinery therein a brake to said machinery, a continuous cord or wire connected to each switch adapted when under tension to break said circuit, and a main switch within the circuit for completing said circuit to disconnect the driven machinery and operate the brake.

3. An electric circuit having a plurality of switches and driven machinery therein and a cord connected to each switch whereby tension on any one or all of said cords will break the connection of the entire circuit and disconnect the driven machinery.

4. The combination of an electric circuit having a plurality of switches therein with a clutch mechanism included in said circuit, and cords or wires connected with said circuit adapted to break the connection therein and disengage the clutch mechanism.

5. The combination of an electric circuit having a plurality of switches therein, cords or wires connected to each switch, and a clutch mechanism operated by the current in said circuit, whereby when a cord is placed under tension the circuit is broken and the clutch mechanism disengaged.

6. The combination of an electric circuit having a plurality of switches, cords or wires connected to each switch, a main safety-switch within the circuit, and a clutch mechanism; whereby the clutch mechanism may be thrown into operative engagement by the main switch or when one of said cords is under tension the circuit is broken and the clutch mechanism disengaged.

7. The combination of an electric circuit having a plurality of switches, cords or wires connected to each switch, a main safety-switch having a resistance thereon, and a clutch mechanism; whereby the clutch mechanism may gradually be thrown into operative engagement, and when said cords are under tension the clutch mechanism may be disengaged.

8. The combination of an electric circuit having a plurality of switches, a pawl adapted to engage the lever in each switch, and cords or wires connected to each pawl, whereby tension on the cord disengages a pawl to break the circuit.

9. The combination of an electric circuit having a plurality of switches, a pawl adapted to engage the lever in each switch, cords or wires connected to each pawl, and a clutch mechanism operated by the current in said circuit; whereby tension on a cord disengages a pawl to break the circuit and render the clutch mechanism inoperative.

10. The combination of an electric circuit having a plurality of switches, a pawl adapted to engage the lever in each switch, cords or wires connected to each pawl, a clutch mechanism and a brake mechanism operated by the current in said circuit, whereby tension on the cord disengages a pawl to break the clutch-circuit and through intermediate means closes the brake-mechanism circuit.

11. The combination of an electric circuit having a plurality of switches, a pawl adapted to engage the lever of each switch, cords or wires connected to each pawl, a clutch mechanism and a break mechanism operated by the current in said circuit, whereby the tension on a cord disengages a pawl to break the clutch-circuit to render the clutch mechanism inoperative and a reverse current through the circuit is produced to render the brake mechanism operative.

12. In a system of control as described, an electrical circuit having a plurality of switches, moving machinery, cords adjacent said machinery connected to and operative on said switches, and a clutch mechanism operated by the current in said circuit, whereby tension on said cord will break the circuit rendering the clutch mechanism inoperative and stopping the moving machinery.

13. A system as described consisting of an electrical circuit having a plurality of switches, a clutch mechanism connected to a line-shafting, machines driven from said line-shafting, and cords adjacent said machinery connected to and operative on said switches, whereby tension on a cord breaks said circuit to disengage the clutch mechanism and stop the machinery.

14. The combination in an electrical circuit of a single shaft, a driving-pulley and a driven pulley thereon, means to clutch said pulleys to rotate together, a non-rotatable brake member on the shaft, and means within the circuit for operating said clutch and brake.

In testimony whereof I affix my signature in presence of two witnesses.

HARRY A. WILLIAMS.

Witnesses:
JOHN R. VAUGHAN,
RAYMOND E. LEWIS.